United States Patent
Suzuki et al.

[11] Patent Number: 6,077,187
[45] Date of Patent: Jun. 20, 2000

[54] ELECTRONIC TRANSMISSION CONTROL SYSTEM WITH FAIL-SAFE SYSTEM FOR AUTOMOTIVE VEHICLE WITH CONTINUOUSLY VARIABLE AUTOMATIC TRANSMISSION

[75] Inventors: Akito Suzuki; Tateki Jozaki; Hirofumi Okahara, all of Kanagawa, Japan

[73] Assignee: Nissan Motor Co. Ltd., Yokohama, Japan

[21] Appl. No.: 09/112,445

[22] Filed: Jul. 9, 1998

[30] Foreign Application Priority Data

Jul. 9, 1997 [JP] Japan .................................... 9-183602

[51] Int. Cl.⁷ ................................................... F16H 61/16
[52] U.S. Cl. .................................. 477/48; 477/46; 477/49; 477/906
[58] Field of Search .................................. 477/45, 46, 48, 477/906, 49

[56] References Cited

U.S. PATENT DOCUMENTS

| | | | |
|---|---|---|---|
| 4,764,156 | 8/1988 | Ohkumo | 477/906 X |
| 5,052,246 | 10/1991 | Yamaguchi | 477/906 X |
| 5,334,102 | 8/1994 | Sato | 474/28 |

FOREIGN PATENT DOCUMENTS 61-105347  5/1986  Japan .

*Primary Examiner*—Khoi Q. Ta
*Attorney, Agent, or Firm*—Foley & Lardner

[57] ABSTRACT

An electronic transmission control system having a fail-safe system for an automotive vehicle with a continuously variable automatic transmission whose speed-change ratio is changeable continuously depending on vehicle speed and engine load, comprises a hydraulic modulator producing at least a regulated line pressure necessary to adjust the speed-change ratio hydraulically, a desired speed-change ratio arithmetic processing section for calculating a desired speed-change ratio based on the vehicle speed and the engine load, and a desired line pressure arithmetic processing section for calculating a desired line pressure based on the desired speed-change ratio and the engine load. Also provided is a fail-safe section comprises a comparing portion for comparing the desired line pressure to a predetermined line pressure threshold above which the desired line pressure is within an unreasonably high line pressure zone, a decision portion for deciding on the basis of a result of comparison of the comparing portion whether the desired line pressure is above the predetermined line pressure threshold, and a speed-change ratio retaining portion for retaining the speed-change ratio of the continuously variable automatic transmission unchanged, when the desired line pressure exceeds the predetermined line pressure threshold.

26 Claims, 6 Drawing Sheets

ELECTRONIC TRANSMISSION CONTROL SYSTEM WITH FAIL-SAFE SYSTEM FOR AUTOMOTIVE VEHICLE WITH CONTINUOUSLY VARIABLE AUTOMATIC TRANSMISSION

The contents of Application No. TOKUGANHEI 9-183602, filed Jul. 9, 1997, in Japan is hereby incorporated by reference.

BACKGROUND OF THE INVENTION

1. Field of the Invention

The present invention relates to an electronic transmission control system (a transmission ECU) employing a fail-safe system, capable of avoiding malfunction of the transmission ECU for a continuously variable automatic transmission, even in presence of a failure of the ECU.

2. Description of the Prior Art

In recent years, there have been proposed and developed various continuously variable transmissions, such as a belt type continuously variable automatic transmission, a toroidal type continuously variable automatic transmission, or the like. Japanese Patent Provisional Publication No. 61-105347 has disclosed a belt type continuously variable automatic transmission, often abbreviated to "CVT".

SUMMARY OF THE INVENTION

In such continuously variable automatic transmissions, it is desirable to prevent the possibility of uncomfortable automatic shifting operation (e.g., rapid downshift toward near the lowest speed-change ratio), regardless of the presence or absence of a fault condition in a transmission ECU (electronic control unit).

Accordingly, it is an object of the invention to provide an electronic transmission control system with a fail-safe system for an automotive vehicle with a continuously variable automatic transmission, which is capable of preventing the possibility of uncomfortable automatic shifting operation (e.g., rapid downshift toward near the lowest speed-change ratio), even in the presence of a failure or fault condition (or an abnormality) in a transmission ECU (electronic control unit) for the continuously variable automatic transmission such as a belt type CVT, or a toroidal type CVT.

It is another object of the invention to provide an electronic transmission control system with a fail-safe system for an automotive vehicle with a continuously variable automatic transmission, which is capable of preventing the possibility of uncomfortably rapid automatic downshift toward the lowest speed-change ratio, while utilizing a single vehicle speed sensor used for detection of the vehicle speed, instead of two speed sensors, namely a primary pulley speed sensor and a secondary pulley speed sensor, both used for calculation of a speed-change ratio (or a transmission ratio) of the continuously variable automatic transmission, even in the presence of a failure or fault condition in a transmission ECU for the continuously variable automatic transmission.

In order to accomplish the aforementioned and other objects of the present invention, an electronic transmission control system having a fail-safe system for an automotive vehicle with a continuously variable automatic transmission whose speed-change ratio is changeable continuously depending on vehicle speed and engine load comprises a hydraulic modulator producing at least a regulated line pressure necessary to adjust the speed-change ratio hydraulically, a desired speed-change ratio arithmetic processing section for calculating a desired speed-change ratio based on the vehicle speed and the engine load, a desired line pressure arithmetic processing section for calculating a desired line pressure based on the desired speed-change ratio and the engine load, and a fail-safe section. The fail-safe section comprises a comparing portion for comparing the desired line pressure to a predetermined line pressure threshold above which the desired line pressure is within an unreasonably high line pressure zone, a decision portion for deciding on the basis of a result of comparison of the comparing portion whether the desired line pressure is above the predetermined line pressure threshold, and a speed-change ratio retaining portion for retaining the speed-change ratio of the continuously variable automatic transmission unchanged, when the desired line pressure exceeds the predetermined line pressure threshold.

DESCRIPTION OF THE PREFERRED EMBODIMENTS

Figure 1:
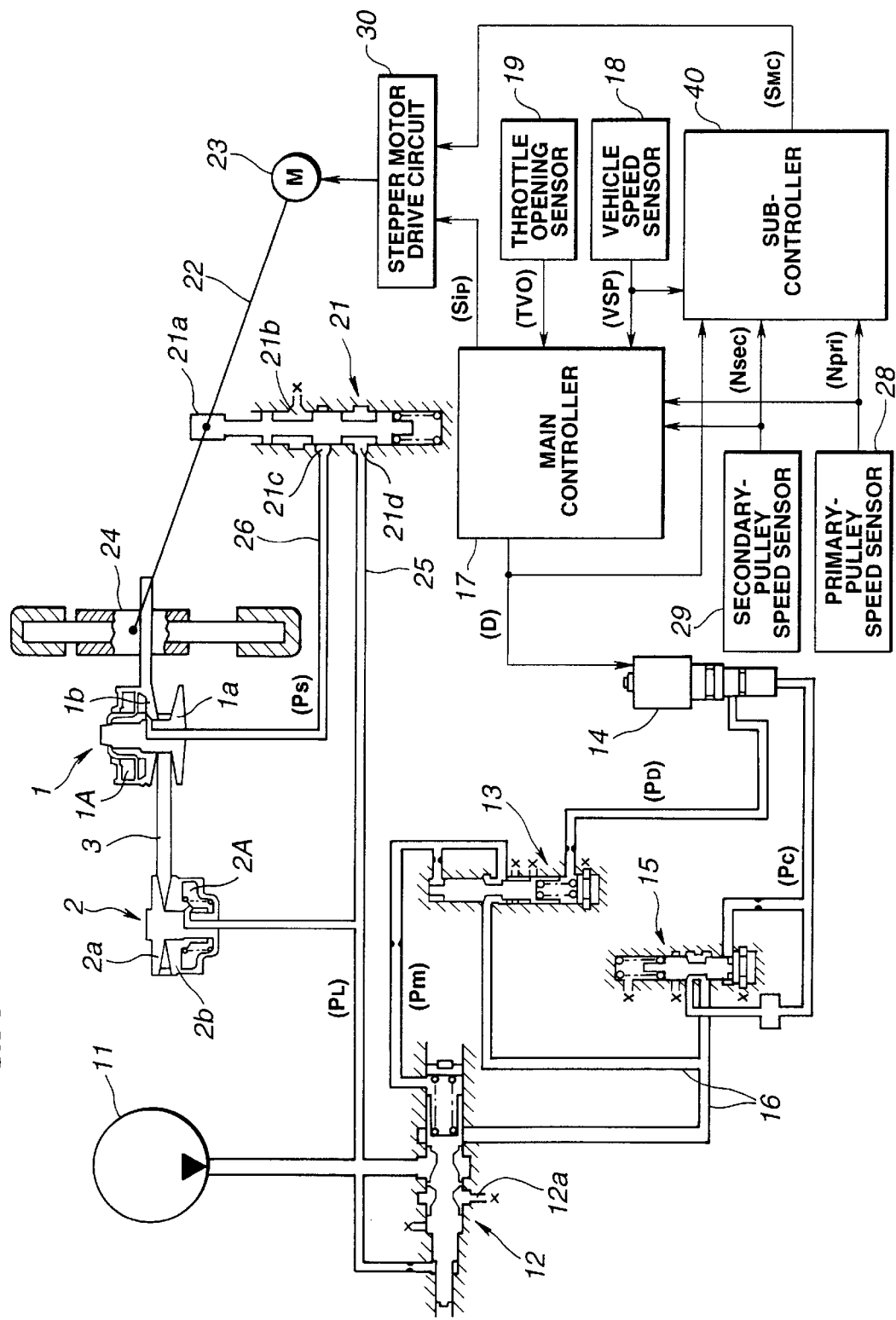
FIG. 1 is a system diagram illustrating an automatic speed-change control system for a belt-type continuously variable automatic transmission which is electronically controlled by an electronic transmission control system combined with a fail-safe system of the invention.

Referring now to the drawings, particularly to FIG. 1, the automobile electronic transmission control system with a fail-safe system of the invention is exemplified in a belt-type continuously variable automatic transmission. As clearly seen in FIG. 1, the belt-type continuously variable automatic transmission, often called "CVT", has primary and secondary—driving and driven—pulleys 1 and 2 whose effective diameters are continuously changeable. The primary pulley is often called an "input pulley", whereas the secondary pulley is often called an "output pulley". The CVT has a segmented steel belt 3 wound on both the primary and secondary pulleys 1 and 2. Although it is not shown in FIG. 1, the output shaft of the engine is connected to the primary pulley 1 via a so-called lock-up torque converter or an electromagnetic clutch, therefore, output of the engine is transmitted to the secondary pulley 2 by the segmented steel belt 3. A line pressure is suitably compensated or regulated as a secondary pulley actuation pressure by means of a line-pressure control system (involving a plurality of valves 12, 13, 14, and 15), and then the compensated or regulated line pressure $P_L$ is fed into a driven-pulley hydraulic actuator 2A of the secondary pulley 2. The primary pulley 1 comprises a stationary conical flange 1a and an adjustable conical flange (or a movable flange) 1b to form a V-shaped groove and consequently to form a variable width pulley 1. In a conventional manner, the movable flange 1b is slidably connected onto the central shaft of the stationary flange 1a by means of linear ball bearing splines (not shown for the purpose of illustrative simplicity), in such a manner as to prevent relative rotation of the movable flange 1b to the stationary flange 1a and simultaneously to permit axial sliding movement of the movable pulley 1b. relative to the stationary pulley 1a. In the same manner, the secondary pulley 2 comprises a stationary conical flange 2a and an adjustable conical flange (or a movable flange) 2b to form a V-shaped groove and to form a variable width pulley 2. The movable flange 2b is slidably connected onto the central shaft of the stationary flange 2a by means of linear ball bearing splines (not shown), in such a manner as to prevent relative rotation of the movable flange 2b to the stationary flange 2a and simultaneously to permit axial sliding movement of the movable pulley 2b relative to the stationary pulley 2a. As seen in FIG. 1, a speed-change control valve 21 is fluidly connected to a line-pressure input line 25 of the line-pressure control system, to produce a so-called speed-change control pressure $P_S$ which is further regulated at a designated pressure level from the properly compensated or regulated line pressure $P_L$ generated from the line-pressure control system. The speed-change control pressure $P_S$, often called a "primary pressure" is fed via a speed-change control pressure output line 26 into the driving-pulley hydraulic actuator 1A of the primary pulley 1 as the primary pulley actuation pressure. The speed-change control pressure $P_S$ is applied to the movable flange 1b of the primary pulley, so that the movable flange 1b moves toward the stationary flange 1a, whereas the compensated line pressure $P_L$ is applied to the movable flange 2b of the secondary pulley, so that the movable flange 2b moves toward the stationary flange 2a. The axial position of the primary-pulley movable flange 1b is controlled by the compensated line pressure $P_L$ in the primary pulley actuation cylinder of the driving-pulley hydraulic actuator 1A. On the other hand, the axial position of the secondary-pulley movable flange 2b is controlled by the coil spring bias plus speed-change control pressure ($P_S$) in the smaller-diameter secondary pulley actuation cylinder of the driven-pulley hydraulic actuator 2A. Usually, a pressure-receiving area of the primary-pulley movable flange 1b receiving the speed-change control pressure $P_S$ is designed to be two-times greater than that of the secondary-pulley movable flange 2b receiving the compensated line pressure $P_L$. With the previously-noted arrangement, the effective diameters of the primary and secondary pulleys 1 and 2 are continuously changeable, in response to the differential pressure between the compensated line pressure $P_L$ and the speed-change control pressure $P_S$. In this manner, the speed-change ratio of the CVT can be continuously variable within certain limits, depending on the previously-noted differential pressure.

Hereunder described in detail is the line-pressure control system by reference to the system diagram of FIG. 1. In the hydraulic circuit shown in FIG. 1, ports marked by "X" denote drain ports. The line-pressure control system comprises a hydraulic pressure source 11, such as a hydraulic pump, a pressure regulator valve 12, a pressure modifier valve 13, a line-pressure solenoid valve 14, and a pilot valve 15. The pressure regulator valve 12 is provided for regulating the discharge pressure from the pressure source 11 to a pressure level. The pressure modifier valve 13 is connected to the pressure regulator valve 12, for adjusting the axial position of the valve spool of the pressure regulator valve 12 by applying a modifier pressure $P_m$ to a spring-biased spool end of the pressure regulator valve 12, thus modifying the pressure level of the hydraulic pressure generated from the pressure regulator valve 12. The line-pressure solenoid valve 14 is connected to the pressure modifier valve 13, for adjusting the axial position of the valve spool of the pressure modifier valve 13 by applying a duty-cycle dependent pressure $P_D$ to a spring-biased spool end of the pressure modifier valve 13, thus varying the modifier pressure $P_m$ output from the pressure modifier valve 13. The pilot valve 15 is connected to the solenoid valve 14, for supplying a pilot pressure $P_C$ to the inlet port of the solenoid valve 14.

In more detail, the pressure regulator valve 12 acts to regulate the discharge pressure from the pressure source 11 to the line pressure $P_L$ based on the modifier pressure $P_m$, while leaking the working fluid discharged from the pressure source 11 into the connection lines 16, and also draining part of the working fluid through a drain port 12a as occasion demands. As seen in FIG. 1, when the modifier pressure $P_m$ is high, the spool of the pressure regulator valve 12 is kept at the axially leftward position (viewing FIG. 1) by way of the spring bias plus modifier pressure $P_m$ (of the high pressure level), so that the flow rate of working fluid flowing through the drain port 12a is reduced to the minimum, and thus the line pressure $P_L$ also becomes high. Conversely, as the modifier pressure $P_m$ gradually reduces to the lowest level, the spool of the pressure regulator valve 12 moves axially rightward, with the result that the flow rate of working fluid flowing through the drain port 12a becomes high, and thus the line pressure $P_L$ becomes low. In this manner, the line pressure $P_L$ output from the pressure regulator valve 12 increases, as the modifier pressure $P_m$ increases. The pilot valve 15 serves to convert the pressure level of the working fluid leaked out of the pressure regulator valve 12 into a pilot pressure $P_C$ of a constant pressure level, and to feed the pilot pressure $P_C$ to the inlet port of the solenoid valve 14. In the shown embodiment, the above-mentioned line-pressure solenoid valve 14 comprises a typical duty-cycle controlled electromagnetic solenoid valve. Although it is not clearly shown, the axial position of the valve spool of the solenoid valve 14 is controlled by way of at least the spring bias of a coil spring (not shown) and the attraction force produced by the electromagnetic solenoid of the solenoid valve 14. In a conventional manner, the solenoid valve 14 is energized and de-energized by a pulsewidth modulated (PWM) voltage signal at a controlled duty cycle or duty ratio D. The duty cycle pulsewidth modulated (PWM) voltage signal is output from the main controller 17 to the electromagnetic solenoid of the solenoid valve 14. The solenoid valve 14 receives the pilot pressure $P_C$ from the pilot valve 15 and serves to produce a so-called duty-cycle dependent pressure $P_D$ (simply a duty pressure $P_D$) from the pilot pressure $P_C$, depending on the duty cycle value D. The solenoid valve 14 is designed so that the duty pressure $P_D$ increases, as the duty cycle value D increases. The duty pressure $P_D$ is applied to the spring-biased spool end of the pressure modifier valve 13. The pressure modifier valve 13 receives the working fluid leaked out of the pressure regulator valve 12, via the connection line 16. As may be appreciated, the upward shifting amount of the valve spool of the pressure modifier valve 13 increases, as the duty pressure $P_D$ (or the duty cycle value D) increases. The uppermost position (as seen in FIG. 1) of the valve spool of the modifier valve 13 corresponds to the maximum upward shifting position where the opening size of the modifier-valve inlet port is held at the maximum to generate the highest modifier pressure $P_m$. In this manner, the modifier pressure $P_m$ becomes higher, as the duty cycle value D becomes increased. As previously discussed, since the line pressure $P_L$ builds up substantially in proportion to the increase in the modifier pressure $P_m$, the line pressure $P_L$ increases in accordance with the increase in the duty cycle value D. The duty cycle value D of the PWM voltage signal to be applied to the electromagnetic solenoid of the solenoid valve 14 is determined by the main controller 17, as fully described hereinbelow.

In order to perform a speed-change control of the CVT, in addition to determining the duty cycle value D necessary for the line-pressure control, the input interface of the main controller 17 receives various signals (VSP, TVO, $N_{pri}$, $N_{sec}$) from engine/vehicle sensors, namely a vehicle speed sensor 18, a throttle opening sensor 19, a primary-pulley rotational speed sensor (or a transmission input-shaft speed sensor) 28, and a secondary-pulley rotational speed sensor (or a transmission output-shaft speed sensor) 29. The vehicle speed sensor 18 is provided for detecting the vehicle speed VSP. The throttle opening sensor 19 is provided for generating a throttle-opening sensor signal indicative of a throttle opening (TVO) which is generally defined as a ratio of an actual throttle angle to a throttle angle obtained at wide open throttle. The primary-pulley rotational speed sensor (or the input-shaft speed sensor) 28 is generally located near the flanged portion of the primary pulley 1, to detect the transmission input-shaft rotational speed $N_{pri}$. Similarly, the secondary-pulley rotational speed sensor (or the output-shaft speed sensor) 29 is generally located near the flanged portion of the secondary pulley 2, to detect the transmission output-shaft rotational speed $N_{sec}$. The duty cycle value D necessary for the line pressure control is determined by the main controller 17, as follows.

In order for the processor (CPU or MPU) employed in the main controller to arithmetically calculate a duty cycle value D for the electromagnetic solenoid valve 14, the main controller, first of all, extracts the informational data, namely the more recent transmission input-shaft speed data $N_{pri}$, the more up-to-date transmission output-shaft speed data $N_{sec}$, and the more recent throttle opening data TVO, and then the processor derives a speed-change ratio (or a pulley ratio) $i_P$ as a ratio ($N_{pri}/N_{sec}$) of the transmission input-shaft speed $N_{pri}$ and the transmission output-shaft speed $N_{sec}$. After this, the desired line pressure $P_{LO}$ is retrieved from the pre-programmed characteristic map shown in FIG. 5, depending on both the speed-change ratio $i_P$ (=$N_{pri}/N_{sec}$) arithmetically calculated and the throttle opening TVO detected. Then, the main controller derives or calculates the duty cycle value D from the retrieved desired line pressure by virtue of a preprogrammed map (not shown) representative of the relationship between the desired line pressure value $P_{LO}$ and the duty cycle value D. As can be appreciated from the preprogrammed characteristic map shown in FIG. 5, the substantially 45° down-sloped speed-change ratio ($i_P$) plus throttle opening (TVO) dependent desired line pressure control characteristic line (as indicated by the two-dotted lines) tends to gradually shift away from the origin O toward the predetermined speed-change ratio ($i_P$) dependent duty-cycle set value characteristic line ($D_{S1}$), as the throttle opening TVO increases toward the maximum throttle opening, e.g., 8/8. In other words, the substantially 45° down-sloped speed-change ratio ($i_P$) plus throttle opening (TVO) dependent desired line pressure control characteristic line tends to gradually shift toward the origin O, as the throttle opening TVO decreases down to the minimum throttle opening, e.g., 0/8. The duty cycle PWM voltage signal of the duty cycle value D, retrieved from the map of FIG. 5, based on both the speed-change ratio $i_P$ and the throttle opening TVO, is output from the output interface (involving a drive circuit operating the electromagnetic solenoid valve 14) of the main controller 17 to the solenoid valve 14. Then, the solenoid valve 14 converts the constant pilot pressure $P_C$ from the pilot valve 15 into the duty pressure $P_D$ based on the duty ratio D, and thereafter the duty pressure $P_D$ is fed from the solenoid valve 14 to the pressure modifier valve 13. The pressure modifier valve 13 produces the modifier pressure $P_m$ based on the duty pressure $P_D$, and then the modifier pressure $P_m$ is fed into the pressure regulator valve 12. As a consequence, the pressure regulator valve 12 can regulate the discharge pressure from the pressure source 11 to the desired line pressure $P_{LO}$ based on the duty cycle value D. In this manner, the line pressure $P_L$ generated from the pressure regulator valve 12 can be adjusted in a manner so as to become identical to the desired line pressure $P_{LO}$ retrieved from the preprogrammed characteristic map shown in FIG. 5.

Figure 2:
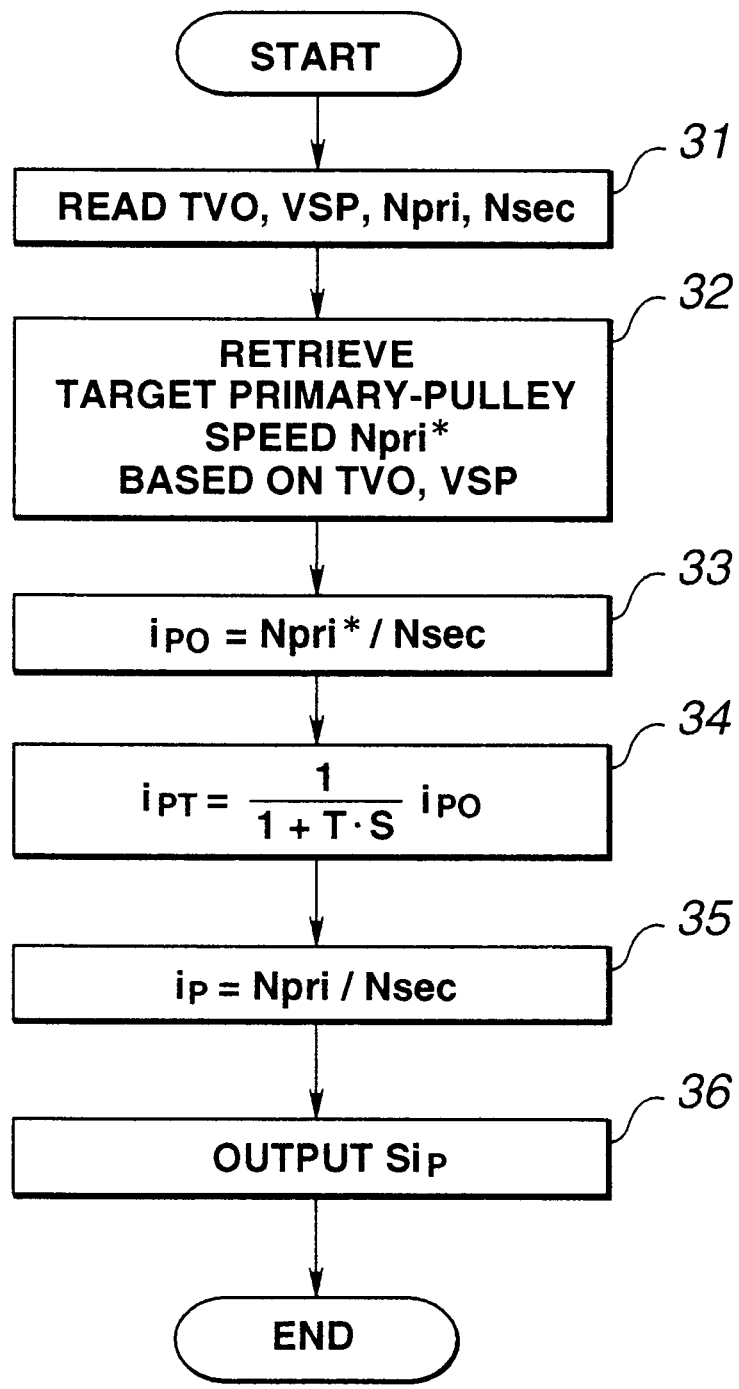
FIG. 2 is a flow chart illustrating a speed-change control program executed by a main controller employed in the automatic speed-change control system shown in FIG. 1.

On the other hand, the speed-change control system of the CVT comprises the speed-change control valve 21, a speed-change link 22, a stepper motor 23, and a shifter 24. Generally, the line-pressure control system (12, 13, 14, 15, 16) and the speed-change control valve 21 and the hydraulic circuits 25 and 26 are constructed as a hydraulic modulator unit. On the other hand, the speed-change link 22, the stepper motor 23, and the shifter 24 are constructed as a speed-change link unit and operably attached to the housing of the hydraulic modulator. The slidable shifter 24 is located near and parallel to the movable flange 1b of the primary pulley 1. The portion of the slidable shifter 24 is fixedly connected to the outer periphery of the movable flange 1b of the primary pulley, so that the shifter 24 is displaceable together with the movable flange 1b. As seen in FIG. 1, one end of the speed-change link 22 is mechanically linked to the slidable portion of the shifter 24 pivotably and somewhat axially movably in the longitudinal direction of the link 22 at the leftmost connecting point by way of pin plus cam-hole connection, while the other end of the speed-change link 22 is mechanically linked to the drive shaft of the stepper motor 23 via an additional linkage (usually such as rack and pinion) pivotably and somewhat axially movably in the longitudinal direction of the link 22 at the rightmost connecting point by way of pin plus cam-hole connection. Also, the midpoint of the speed-change link 22 is mechanically linked to one end of the valve spool 21a of the speed-change control valve 21 rotatably at the middle connecting point. The speed-change control valve 21 is provided for reducing the incoming line pressure $P_L$ via the line-pressure input line 25, and for producing the speed-change control pressure $P_S$ from the speed-change control pressure output line 26. As seen in FIG. 1, the upper communication port 21c, communicating the speed-change control output line 26, begins to open, when the spool 21a moves upward via the speed-change link 22 with rotation of the stepper motor 23. The opening size of the upper communication port 21c increases, as the spool 21a moves upward via the speed-change link 22 with further rotation of the stepper motor 23. As can be appreciated, if the spool 21a shifts up to the uppermost position, a full fluid-communication between the upper communication port 21c (communicating the speed-change control pressure output line 26) and the lower communication port 21d (communicating the line-pressure input line 25), is established. This permits the speed-change control pressure $P_S$ to be adjusted toward the incoming line-pressure $P_L$. In this case, the speed-change control pressure $P_S$ rises up to the incoming line pressure $P_L$. As previously discussed, with the pressure rise in the speed-change control pressure $P_S$, the movable flange 1b of the primary pulley shifts toward the stationary flange 1a, and thus the pulley width of the primary pulley 1 becomes narrower. The narrower primary pulley width up-shifts the speed-change ratio of the CVT toward high. Under these conditions, when the spool 21a moves downward via the speed-change link 22 with reverse-rotation of the stepper motor 23, the upper communication port 21c is closed once, and then begins to open in a manner so as to establish fluid communication between the upper communication port 21c and the drain port 21b, while blocking fluid communication between the upper and lower communication ports 21c and 21d. As a result, part of the working fluid in the speed-change control pressure output line 26 and the primary-pulley actuation cylinder of the driving-pulley hydraulic actuator 1A is relieved via the upper communication port 21c from the drain port 21b. As a result of this, the speed-change control pressure $P_S$ begins to reduce. With the pressure fall in the speed-change control pressure $P_S$, the movable flange 1b of the primary pulley shifts away from the stationary flange 1a, and thus the pulley width of the primary pulley 1 becomes wider. The wider primary pulley width down-shifts the speed-change ratio of the CVT toward low. In this manner, the stroke of the spool 21a is adjustable through the linkage 22 by means of the stepper motor 23. The angular steps or essentially uniform angular movements of the stepper motor 23 can be obtained electromagnetically depending on a stepper-motor drive signal $S_{iP}$ from the output interface of the main controller 17 via a stepper-motor drive circuit 30. Actually, the speed-change control of the CVT is performed by way of adjustment of the angular steps based on the drive signal $S_{iP}$ from the main controller 17. The speed-change control routine executed by the processor of the main controller 17 is hereinbelow described in detail by reference to the flow chart shown in FIG. 2.

In step 31, the throttle opening TVO, the vehicle speed VSP, the transmission input-shaft speed $N_{pri}$, and the transmission output-shaft speed $N_{sec}$ are read.

Figure 3:
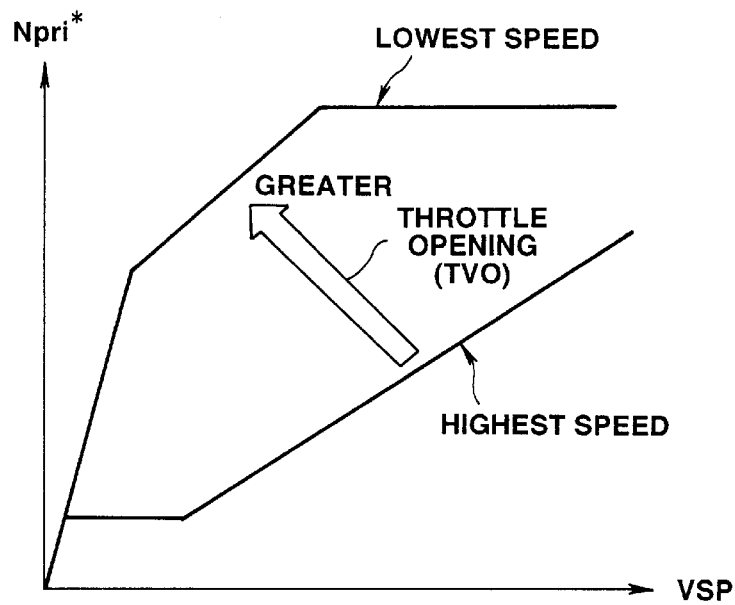
FIG. 3 is a characteristic map illustrating a predetermined speed-change pattern based on the target primary pulley rotational speed ($N_{pri}$*), the vehicle speed (VSP), and the throttle opening (TVO), which map is used in the automatic speed-change control routine shown in FIG. 2.

In step 32, a target primary pulley rotational speed $N_{pri}^*$ is retrieved, from a pre-programmed speed-change control characteristics, for example, from a predetermined characteristic map as shown in FIG. 3, on the basis of both the throttle opening TVO (considered to be equivalent to the load on the engine) and the vehicle speed VSP. In the map shown in FIG. 3, the upper polygonal line indicates the lowest-speed transmission gear ratio line (or the lowest-speed speed-change-ratio line or the lowest-speed pulley ratio line), whereas the lower polygonal line indicates the highest-speed transmission gear ratio line (or the highest-speed speed-change-ratio line or the highest-speed pulley ratio line). The zone, sandwiched between the upper and lower polygonal lines, corresponds to a speed-change control enable zone (simply a speed-change zone). As seen in FIG. 3, the speed-change line tends to shift from the lower polygonal line toward the upper polygonal line, so that the target primary pulley rotational speed $N_{pri}^*$ is set at a higher revolution speed, as the vehicle speed VSP and/or the throttle opening TVO (considered to be equivalent to the engine load) increases.

In step 33, a final target speed-change ratio $i_{PO}$ is arithmetically calculated as a ratio ($N_{pri}^*/N_{sec}$) of the target primary pulley rotational speed $N_{pri}^*$ to the secondary pulley rotational speed $N_{sec}$.

In step 34, a transient target speed-change ratio $i_{PT}$, which is required for realizing the previously-noted final target speed-change ratio $i_{PO}$ with a required time delay defined by a predetermined time constant T (or a lag coefficient), is calculated from the following expression.

$$i_{PT} = [1/(1+T\cdot S)]i_{PO}$$

where T is a predetermined time constant, and S denotes a Laplace's operator or a Laplacian.

In step 35, an actual speed-change ratio $i_P$ (or an actual pulley ratio or an actual transmission gear ratio) is arithmetically calculated as a ratio ($N_{pri}/N_{sec}$) of the primary pulley rotational speed (i.e., the transmission input-shaft speed) $N_{pri}$ to the secondary pulley rotational speed (i.e., the transmission output-shaft speed) $N_{sec}$.

Figure 4:
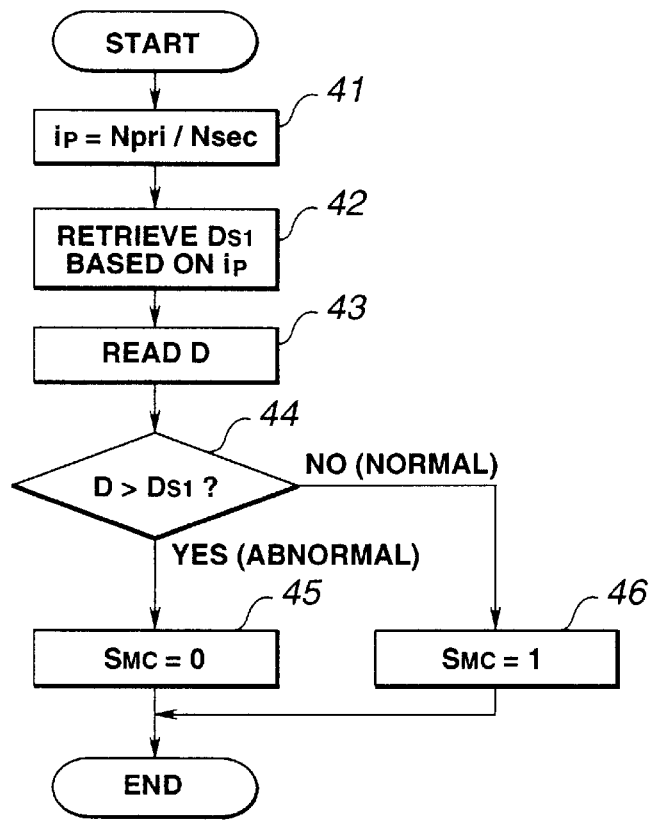
FIG. 4 is a flow chart illustrating one example of a routine of decision of failure in the main controller, executed by a sub-controller constructing part of the fail-safe system of the invention.

In step 36, the stepper-motor drive signal $S_{iP}$ based on the transient target speed-change ratio $i_{PT}$ is output from the output interface of the main controller to one input terminal of the stepper-motor drive circuit 30, so that the actual speed-change ratio $i_P$ is adjusted toward the transient target speed-change ratio $i_{PT}$. Note that the other input terminal of the stepper-motor drive circuit 30 receives a main-controller failure decision instruction signal $S_{MC}$ based on a failure-decision routine which is executed by a sub-controller 40 and will be fully described later by reference to the flow chart shown in FIGS. 4 or 6. When the sub-controller 40 decides that the main controller 17 operates normally through the previously-noted failure-decision routine, the stepper-motor drive circuit 30 receives the failure decision instruction signal $S_{MC}$ being an ON signal (or a digital signal of a binary number "1") representative of the normally operating state of the main controller 17. In case of $S_{MC}=1$ (with the main controller operating normally), the stepper-motor drive circuit 30 operates to permit the output of the stepper-motor drive signal $S_{iP}$ therevia to the stepper motor 23. Thus, the speed-change ratio (or the pulley ratio) of the CVT is feed-back controlled, so that the actual speed-change ratio $i_P$ is adjusted toward the transient target speed-change ratio $i_{PT}$. Conversely, when the sub-controller 40 decides that the main controller 17 operates abnormally through the previously-noted failure-decision routine (see FIGS. 4 or 6), the stepper-motor drive circuit 30 receives the failure decision instruction signal $S_{MC}$ being an OFF signal (or a digital signal of a binary number "0") representative of the abnormally operating state of the main controller 17. In case of $S_{MC}=0$ (with the main controller operating abnormally), the stepper-motor drive circuit 30 operates to inhibit the output of the stepper-motor drive signal $S_{iP}$ to the stepper motor 23. Thus, a further speed-change control of the CVT is inhibited from the time when the failure (the abnormality) of the main controller 17 has been detected, and the speed-change ratio of the CVT is held at or fixed to a speed-change ratio $i_P$ set at the time when the main controller failure has been detected. In order to make a main-controller failure decision and to generate the main-controller failure decision instruction signal $S_{MC}$ based on the result of failure-decision, the sub-controller 40 receives the duty cycle PWM voltage signal D from the output interface of the main controller, the vehicle speed indicative signal VSP from the sensor 18, the transmission input-shaft speed indicative signal $N_{pri}$ from the sensor 28, and the transmission output-shaft speed indicative signal $N_{sec}$ from the sensor 29. One example of the failure-decision routine executed by the sub-controller 40 is shown in FIG. 4. In FIG. 4, although a data-read step for the four parameters, namely D, VSP, $N_{pri}$, and $N_{sec}$, is omitted, the latest up-to-date input information (D, VSP, $N_{pri}$, and $N_{sec}$) is read out from the memory of the sub-controller just before step 41, every predetermined sampling time intervals (each time the failure-decision routine is initiated).

In step 41, an actual speed-change ratio $i_P$ (or an actual pulley ratio or an actual transmission gear ratio) is arithmetically calculated as a ratio ($N_{pri}/N_{sec}$) of the transmission input-shaft speed $N_{pri}$ to the transmission output-shaft speed $N_{sec}$.

Figure 5:
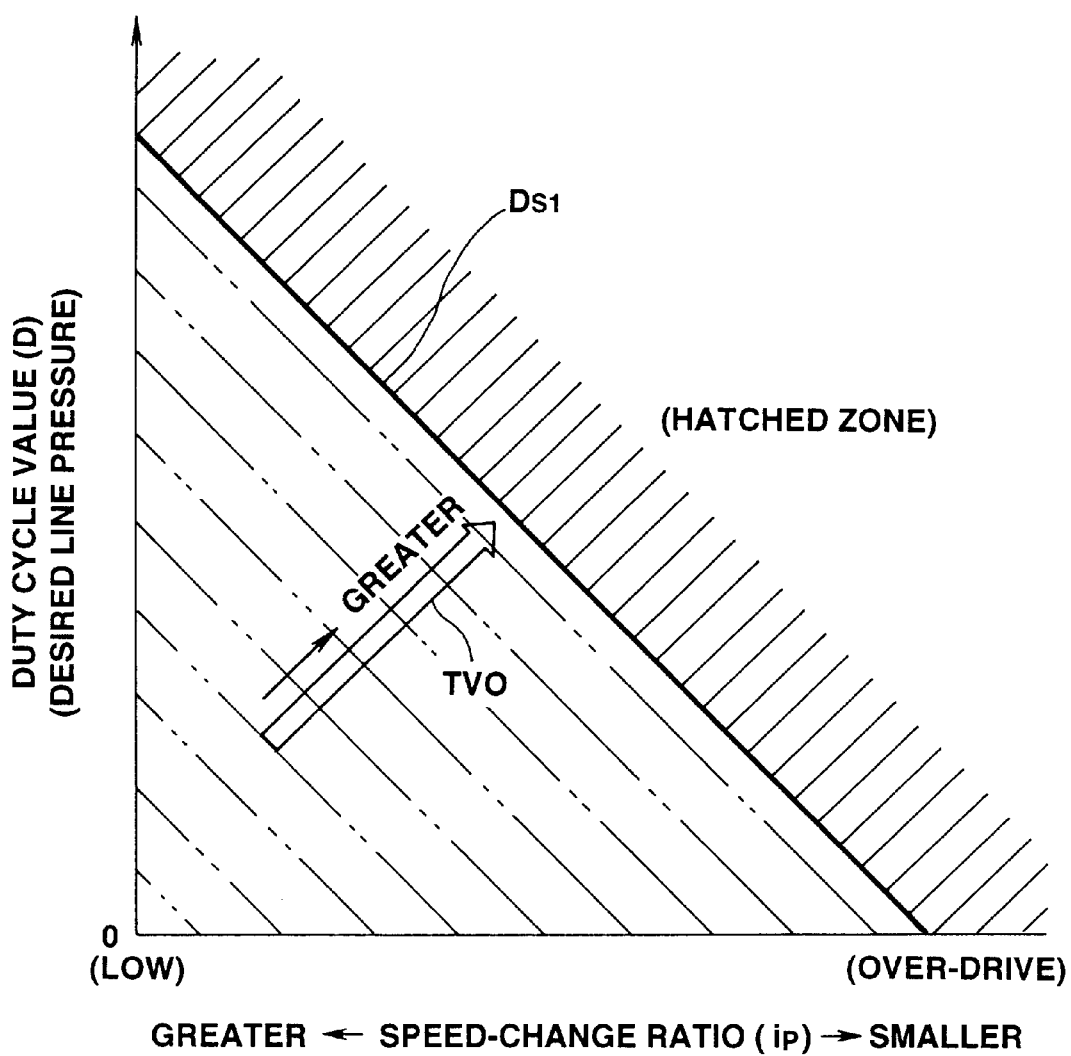
FIG. 5 is a characteristic map corresponding to a pre-programmed desired line pressure control characteristics representing the relationship between the speed-change ratio ($i_P$) and the duty cycle value (D), which value corresponds to the desired line pressure ($P_{LO}$), for every throttle opening (TVO), and simultaneously indicating a predetermined speed-change ratio ($i_P$) dependent duty-cycle set value characteristic line ($D_{S1}$), pre-programmed or predetermined in due consideration of the maximum values of the desired line pressures ($P_{LO}$) for every speed-change ratios ($i_P$).

In step 42, the set value $D_{S1}$ of duty cycle for the line-pressure solenoid valve 14 is retrieved from the predetermined speed-change ratio ($i_P$) dependent duty-cycle set value characteristic line ($D_{S1}$) shown in FIG. 5, on the basis of the actual speed-change ratio ($i_P$) calculated at step 41. As can be appreciated from the predetermined speed-change ratio dependent duty-cycle set value characteristic line shown in FIG. 5, the line-pressure solenoid valve duty-cycle set value $D_{S1}$ is defined or determined as a line-pressure solenoid valve duty cycle corresponding to a maximum value of a desired line pressure $P_{LO}$ given for each of speed change ratios $i_P$. In other words, the predetermined speed-change ratio dependent duty cycle set value characteristic line is a set of points representative of the line-pressure solenoid valve duty cycle values corresponding to the maximum values of the desired line pressures given for every speed change ratios $i_P$, ranging from the lowest-speed (low) pulley ratio to the highest-speed (over-drive) pulley ratio. Therefore, the upper hatched zone exceeding the duty cycle set value characteristic line ($D_{S1}$), corresponds to an excessively high line pressure zone where it is out of bounds of possibility during the line pressure control.

In step 43, the duty cycle value D (essentially corresponding to the desired line pressure $P_{LO}$) of the line-pressure solenoid valve activation PWM voltage signal from the main controller 17 is read.

In step 44, a test is made to determine whether the duty cycle value D (essentially corresponding to the desired line pressure $P_{LO}$) exceeds the line-pressure solenoid valve duty-cycle set value $D_{S1}$ (essentially corresponding to the line-pressure set value or the line pressure threshold) retrieved through step 42. That is, step 44 functions as a comparing portion which is used to compare the duty cycle value D (the desired line pressure $P_{LO}$) with the predetermined line pressure threshold ($D_{S1}$). When the answer to step 44 is in the affirmative (YES), that is, when the duty cycle value D exceeds the duty-cycle set value $D_{S1}$ based on the actual speed-change ratio $i_P$ and thus the duty cycle value D read at step 43 is within the above-mentioned excessively high line pressure zone (the hatched zone) of FIG. 5, the sub-controller 40 decides that the main controller 17 is faulty or operates abnormally. As discussed above, the sub-controller 40 has a decision portion which serves to determine or decide as to whether the duty cycle value D (the desired line pressure $P_{LO}$) is above the predetermined line pressure threshold ($D_{S1}$), on the basis of the result of comparison of the comparing portion (step 44). Then, the failure decision instruction signal $S_{MC}$ is set at "0" at step 45. On the contrary, when the answer to step 44 is in the negative (NO), that is, when the duty cycle value D is below the duty-cycle set value $D_{S1}$ based on the actual speed-change ratio $i_P$ and thus the duty cycle value D read at step 43 is out of the above-mentioned excessively high line pressure zone, the sub-controller 40 decides that the main controller 17 operates normally. Then, the main-controller failure decision instruction signal $S_{MC}$ is set at "1" at step 46.

The main-controller failure-decision instruction signal $S_{MC}$ from the sub-controller 40 is input into the stepper motor drive circuit 30. The stepper motor drive circuit 30 functions to feed the stepper motor drive signal $S_{iP}$ from the main controller 17 to the stepper motor 23, while the main controller 17 operates normally (that is, $D \leq D_{S1}$, $S_{MC}=1$). The speed-change control is performed, so that the actual speed-change ratio $i_P$ is adjusted toward the transient target speed-change ratio $i_{PT}$. On the contrary, while the main controller 17 operates abnormally (that is, $D > D_{S1}$, $S_{MC}=0$), the stepper motor drive circuit 30 functions to inhibit the stepper motor drive signal $S_{iP}$ from being supplied from the main controller 17 to the stepper motor 23. Thus, a further speed-change control of the CVT is inhibited from the time when the failure (the abnormality) of the main controller 17 has been detected, and the speed-change ratio of the CVT is held at or fixed to a speed-change ratio $i_P$ set at the time when the main controller failure has been detected. As set out above, the sub-controller 40 and the stepper motor drive circuit 30 cooperate with each other to retain the speed-change ratio of the CVT at a speed-change ratio $i_P$ set at the time when the main controller failure has been detected (that is, just before the duty cycle value D (the desired line pressure $P_{LO}$) exceeds the predetermined line pressure threshold ($D_{S1}$)). The sub-controller 40 and the stepper motor drive circuit 30 serve as a speed-change ratio retaining portion provided to retain the speed-change ratio of the CVT at a speed-change ratio $i_P$ set just before the duty cycle value D (the desired line pressure $P_{LO}$) exceeds the predetermined line pressure threshold ($D_{S1}$).

As can be appreciated from the above, even when there is an unreasonable speed-change control command, such as the downshift toward the lowest-speed side (the greatest speed-change ratio), which may occur owing to the main controller failure, such an unreasonable speed-change control command is neglected or inhibited by virtue of the main-controller failure decision instruction signal $S_{MC}$ (=0) from the sub-controller 40. This prevents unreasonably rapid deceleration of the vehicle (which may result from rapid downshift occurring during the main-controller failure).

In the fail-safe system of the embodiment previously discussed, the failure decision of the main controller 17 is made by comparing the calculated line-pressure solenoid duty-cycle value D (considered to be equivalent to a desired line pressure $P_{LO}$) to the speed-change ratio dependent duty-cycle set value $D_{S1}$ (regarded as a line-pressure set value). In other words, the main-controller failure decision can be made accurately depending on whether or not the duty cycle value D (the desired line pressure $P_{LO}$) is within the hatched zone (>$D_{S1}$). As set forth above, the speed-change ratio $i_P$ (the pulley ratio of the CVT) is controllable or changeable properly depending on the stepper motor drive signal $S_{iP}$, in absence of the main-controller failure. On the other hand, in presence of the main-controller failure, the speed-change ratio $i_P$ is retained unchanged from the time of detection of the main-controller failure.

Figure 6:
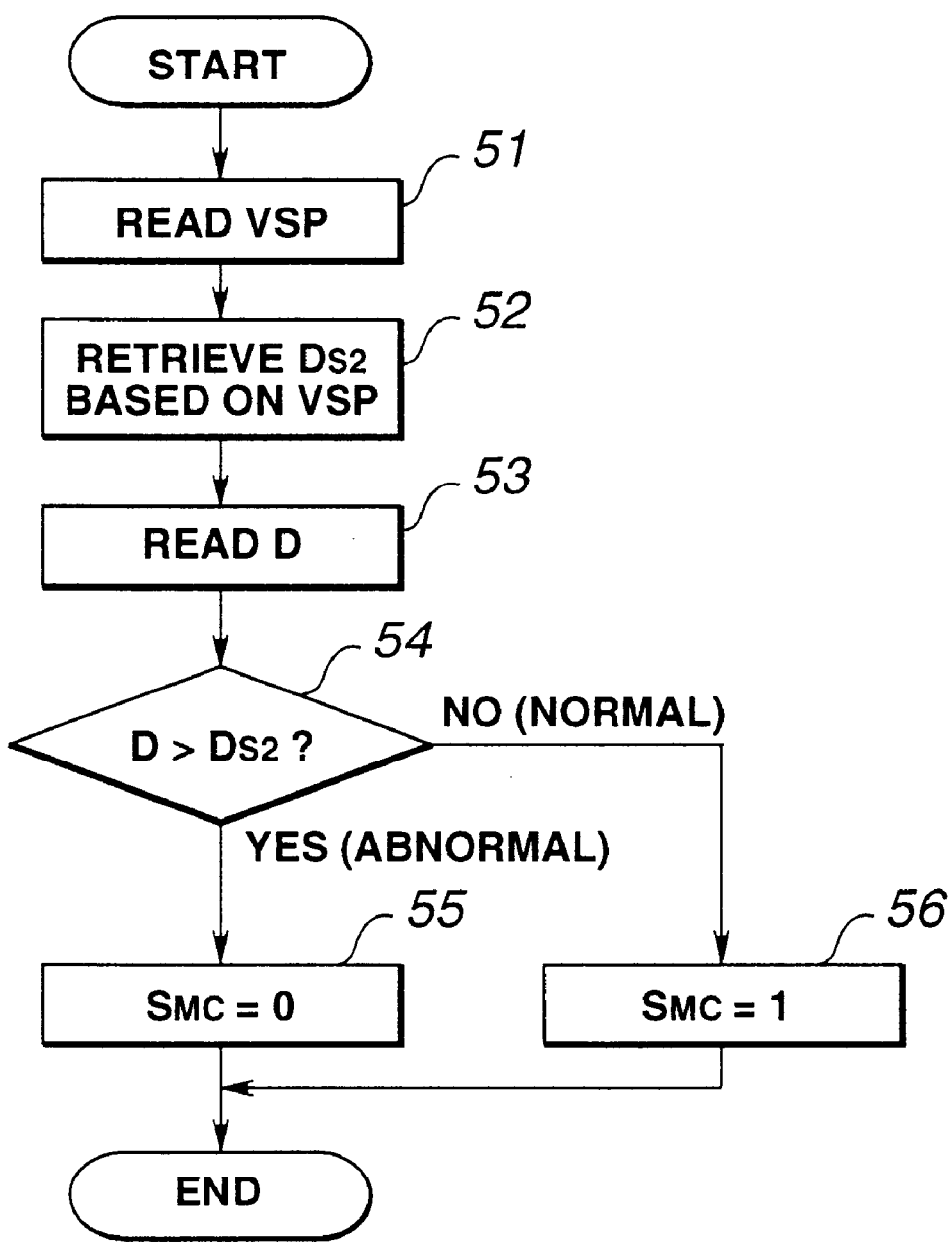
FIG. 6 is a flow chart illustrating another example of a routine of decision of failure in the main controller, executed by a sub-controller constructing part of the fail-safe system of the invention.
Figure 7:
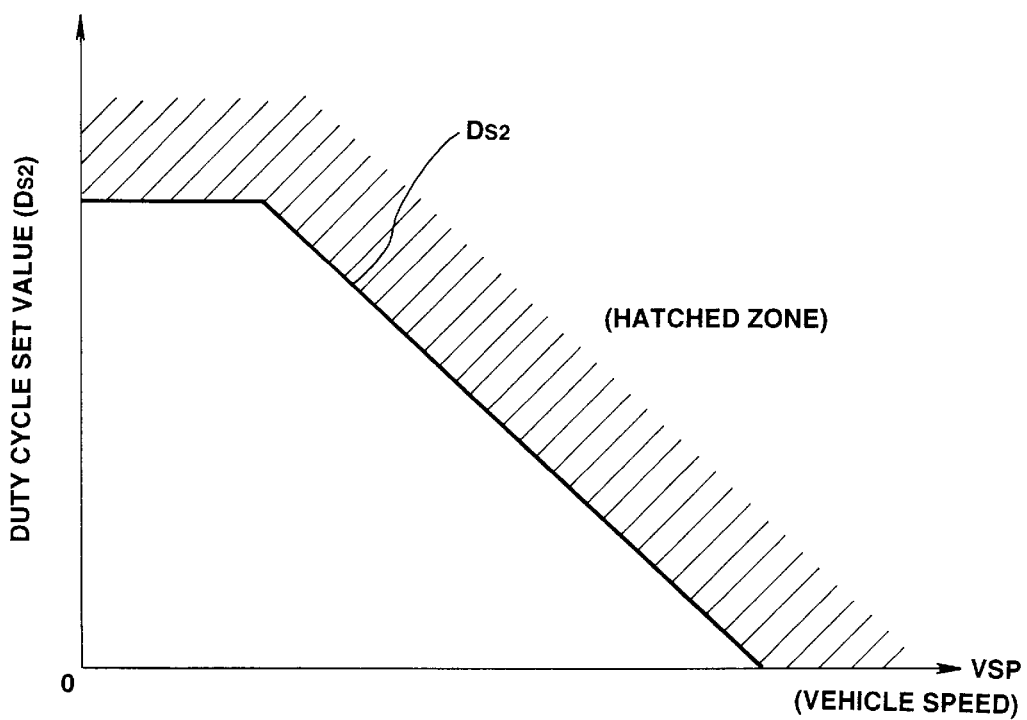
FIG. 7 is a characteristic map illustrating the vehicle speed (VSP) dependent duty-cycle set value characteristic line ($D_{S2}$), pre-programmed or predetermined, accounting for a downshift limit.

As may be appreciated from step 41 of FIG. 4, the failure decision routine of FIG. 4 requires both the transmission input-shaft speed $N_{pri}$ and the transmission output-shaft speed $N_{sec}$. That is, the two speed sensors 28 and 29, respectively generating the sensor signals $N_{pri}$ and $N_{sec}$, are used in the routine of FIG. 4. In comparison of a single speed sensor, there is a problem of a higher possibility of sensor failure in case of the use of two speed sensors 28 and 29. To avoid this, FIGS. 6 and 7 show an example of a single speed sensor 18 utilized for detecting or determining the main controller failure. The other example of the failure-decision routine executable by the sub-controller 40 will be hereunder described in detail by reference to the flow chart of FIG. 6.

In case of the other failure-decision routine shown in FIG. 6, first of all, the vehicle speed VSP is read at step 51. Thereafter, in step 52, the line-pressure solenoid valve duty-cycle set value $D_{S2}$ is retrieved from the predetermined vehicle-speed (VSP) dependent duty-cycle set value characteristic line ($D_{S2}$) shown in FIG. 7, on the basis of the vehicle speed (VSP) read through step 51. The line-pressure solenoid valve duty-cycle set value $D_{S2}$ is properly predetermined or preprogrammed in due consideration of the downshift limit, since the continuously variable automatic transmission such as the belt-type continuously variable automatic transmission (CVT) has the automatic speed-change control system or mechanism as shown in FIG. 1, and thus the CVT has a limit point (or a downshift limit or a downshift threshold) for each line pressure necessary for the speed-change ratio control (the pulley-ratio control), to which the CVT can be downshifted practically. The lower the line pressure $P_L$, the smaller the downshift limit. This means that the downshift limit shifts toward the higher speed side (over-drive), as the line pressure $P_L$ becomes lower. In other words, the downshift operation toward the lowest speed side (or the greater speed-change ratio) is limited more greatly, as the line pressure $P_L$ becomes lower. In view of this, the line-pressure limit (or the line-pressure threshold) must be predetermined or pre-programmed in such a manner as to provide a downshift limit that never produces an unacceptable vehicle deceleration for each vehicle speed (VSP). That is, as seen in FIG. 7, the line-pressure solenoid valve duty-cycle set value $D_{S2}$ is predetermined or pre-programmed as a solenoid valve duty-cycle set value (or a line pressure set value) equivalent to the line pressure limit essentially corresponding to the downshift limit. The downshift limit is preselected or preprogrammed for each vehicle speed VSP, so that the vehicle-deceleration feeling is acceptable or reasonable practically to just below the downshift limit. The hatched zone shown in FIG. 7 is an excessively great duty cycle value zone (or an excessively high line pressure zone) corresponding to an unreasonably excessive downshift zone where unreasonably, unacceptably hard deceleration may occur. In the modified main-controller failure decision routine shown in FIG. 6, the sub-controller 40 decides that the main-controller failure is present, when the line-pressure solenoid valve duty cycle value D calculated is within the hatched zone of FIG. 7.

Returning to the flow chart shown in FIG. 6, in step 53, the duty cycle value D (essentially corresponding to the desired line pressure $P_{LO}$) of the line-pressure solenoid valve activation PWM voltage signal from the main controller 17 is read.

In step 54, a test is made to determine whether the duty cycle value D (essentially corresponding to the desired line pressure $P_{LO}$) exceeds the line-pressure solenoid valve duty-cycle set value $D_{S2}$ (essentially corresponding to the line-pressure set value) retrieved through step 52. When the answer to step 54 is in the affirmative (YES), that is, when the duty cycle value D exceeds the duty-cycle set value $D_{S2}$ based on the vehicle speed VSP and thus the duty cycle value D read at step 53 is within the above-mentioned excessively high line pressure zone (the hatched zone) of FIG. 7, the sub-controller 40 decides that the main controller 17 is faulty or operates abnormally. Then, the failure decision instruction signal $S_{MC}$ is set at "0" at step 55. On the contrary, when the answer to step 54 is in the negative (NO), that is, when the duty cycle value D is below the duty-cycle set value $D_{S2}$ based on the vehicle speed VSP and thus the duty cycle value D read at step 53 is out of the above-mentioned excessively high line pressure zone, the sub-controller 40 decides that the main controller 17 operates normally. Then, the main-controller failure decision instruction signal $S_{MC}$ is set at "1" at step 56.

As set forth above, the main-controller failure decision of FIG. 4 is made on the basis of the duty cycle value D calculated, and the speed change ratio calculated $i_P$ ($=N_{pri}/N_{sec}$), whereas the failure decision of FIG. 6 is made on the basis of the duty cycle value D calculated, and the vehicle speed data VSP. That is to say, the vehicle speed sensor signal data VSP is used instead of both the transmission input-shaft speed data $N_{pri}$ and the transmission output-shaft speed data $N_{sec}$. In comparison with the use of two speed sensors 28 and 29, the use of only one vehicle speed sensor 18 is advantageous from the viewpoint of a lower sensor failure rate.

Furthermore, in either one of the embodiment shown in FIG. 4 and the modification shown in FIG. 6, for the purpose of the main-controller failure decision, the duty cycle D, functioning as a line-pressure control signal necessary to produce the desired line pressure $P_{LO}$, is used instead of the line pressure $P_L$ itself. In the fail-safe system of the embodiment, there is no need for monitoring the line pressure $P_L$, during the main-controller failure decision. The main controller failure decision can be easily made by way of comparison between the calculated duty cycle value D (essentially corresponding to a desired line pressure $P_{LO}$) and the preprogrammed duty-cycle set value $D_{S1}$ or $D_{S2}$ (a preselected line pressure set value). This contributes to reduction in total production costs of an electronic transmission control system with a fail-safe system for an automotive vehicle with a continuously variable transmission, for example a belt type continuously variable automatic transmission, a toroidal type continuously variable automatic transmission, or the like.

In the shown embodiments, although the belt type CVT is used, other types of a continuously variable automatic transmission, such as a toroidal CVT can be used. Typical details of such a toroidal CVT, being set forth, for example, in U.S. Pat. No. 4,955,246 issued Sep. 11, 1990 to Masaki Nakano and assigned to the assignee of the present invention, the teaching of which are hereby incorporated by reference.

In the shown embodiments, the target primary pulley rotational speed $N_{pri}^*$ is retrieved from the predetermined characteristic map, on the basis of both the throttle opening TVO (used as a parameter representative of engine load) and the vehicle speed VSP, and then the final target speed-change ratio $i_{PO}$ is arithmetically calculated as a ratio ($N_{pri}^*/N_{sec}$) of the target primary pulley rotational speed $N_{pri}^*$ to the secondary pulley rotational speed $N_{sec}$. Alternatively, it will be appreciated that an accelerator opening APS (i.e., a depression amount of the accelerator pedal), which is detectable by means of an accelerator position sensor located near an accelerator pedal, may be used as a parameter indicative of engine load, in place of the throttle opening TVO.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electronic transmission control system having a fail-safe system for an automotive vehicle with a continuously variable automatic transmission whose speed-change ratio is changeable continuously depending on vehicle speed and engine load, comprising:
   a hydraulic modulator producing at least a regulated line pressure necessary to adjust the speed-change ratio hydraulically;
   a desired speed-change ratio arithmetic processing section for calculating a desired speed-change ratio based on the vehicle speed and the engine load;
   a desired line pressure arithmetic processing section for calculating a first duty cycle of a line-pressure solenoid valve that corresponds to a desired line pressure based on the desired speed-change ratio and the engine load; and
   a fail-safe section comprising:
   (a) a comparing portion for comparing the first duty cycle to a second duty cycle of the line-pressure solenoid valve that corresponds to a predetermined line pressure threshold; and
   (b) a speed-change ratio retaining portion for retaining the speed-change ratio of the continuously variable automatic transmission unchanged, when the first duty cycle exceeds the second duty cycle.

2. The electronic transmission control system as claimed in claim 1, wherein said speed-change ratio retaining portion retains the speed-change ratio at a speed-change ratio set just before the desired line pressure exceeds the predetermined line pressure threshold.

3. The electronic transmission control system as claimed in claim 1, wherein the predetermined line pressure threshold is defined as a maximum value of the desired line pressure given for each of speed change ratios of the continuously variable automatic transmission.

4. The electronic transmission control system as claimed in claim 1, wherein the predetermined line pressure threshold is defined as a line pressure set value, providing a downshift limit preselected for each vehicle speed, so that vehicle deceleration feeling is acceptable to just below the downshift limit.

5. The electronic transmission control system as claimed in claim 1, wherein said hydraulic modulator has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said desired line pressure arithmetic processing section derives the duty cycle value from the desired line pressure, and said comparing portion and said decision portion cooperate with each other to make a system-failure decision of the electronic transmission control system by comparing the duty cycle value to a predetermined duty cycle set value corresponding to a maximum value of the desired line pressure given for each of speed change ratios of the continuously variable automatic transmission.

6. The electronic transmission control system as claimed in claim 5, wherein said decision portion outputs a system-failure decision instruction signal of a binary number "0" when the duty cycle value is above the predetermined duty cycle set value based on the desired speed-change ratio, and said speed-change ratio retaining portion retains the speed-change ratio unchanged while the system-failure decision instruction signal of a binary number "0" is output.

7. The electronic transmission control system as claimed in claim 1, wherein said hydraulic modulator has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said desired line pressure arithmetic processing section derives the duty cycle value from the desired line pressure, and said comparing portion and said decision portion cooperate with each other to make a system-failure decision of the electronic transmission control system by comparing the duty cycle value to a predetermined duty cycle set value essentially corresponding to a downshift limit that is preprogrammed for each vehicle speed, so that vehicle-deceleration feeling is acceptable to just below the downshift limit.

8. The electronic transmission control system as claimed in claim 7, wherein said decision portion outputs a system-failure decision instruction signal of a binary number "0" when the duty cycle value is above the predetermined duty cycle set value based on the vehicle speed, and said speed-change ratio retaining portion retains the speed-change ratio unchanged while the system-failure decision instruction signal of a binary number "0" is output.

9. An electronic transmission control system having a fail-safe system for an automotive vehicle with a continuously variable automatic transmission whose speed-change ratio is changeable continuously depending on vehicle speed and engine load, comprising:
   a line pressure control system producing a regulated line pressure;
   a speed-change control system having a speed-change control valve fluidly connected to said line pressure control system for receiving the regulated line pressure and for producing a speed-change control pressure by reducing the regulated line pressure depending on a valve position of the speed-change control valve;
   a link unit having a stepper motor whose angular movement is produced in response to a control command indicative of a desired speed-change ratio based on the vehicle speed and the engine load, and a linkage operable by the stepper motor and mechanically linked to the speed-change control valve, for varying the valve position of the speed-change control valve;
   a desired speed-change ratio arithmetic processing section for calculating a desired speed-change ratio based on the vehicle speed and the engine load;
   a desired line pressure arithmetic processing section for calculating a first duty cycle of a line-pressure solenoid valve that corresponds to a desired line pressure based on the desired speed-change ratio and the engine load; and
   a fail-safe section comprising:
   (a) a comparing portion for comparing the first duty cycle to a second duty cycle of the line-pressure solenoid valve that corresponds to a predetermined line pressure threshold; and
   (b) a speed-change ratio retaining portion for retaining the speed-change ratio of the continuously variable automatic transmission unchanged, by inhibiting the control command from being output to the stepper motor, while the first duty cycle exceeds the second duty cycle.

10. An electronic transmission control system having a fail-safe system for an automotive vehicle with a continuously variable automatic transmission whose speed-change ratio is changeable continuously depending on vehicle speed and engine load, comprising:

a hydraulic modulating means for producing at least a regulated line pressure necessary to adjust the speed-change ratio hydraulically;

a desired speed-change ratio arithmetic processing means for calculating a desired speed-change ratio based on the vehicle speed and the engine load;

a desired line pressure arithmetic processing means for calculating a first duty cycle of a line-pressure solenoid valve that corresponds to a desired line pressure based on the desired speed-change ratio and the engine load; and a fail-safe means comprising:
(a) a comparing means for comparing the first duty cycle to a second duty cycle of the line-pressure solenoid valve that corresponds to a predetermined line pressure threshold; and
(b) a speed-change ratio retaining means for retaining the speed-change ratio of the continuously variable automatic transmission unchanged, when the first duty cycle exceeds the second duty cycle.

11. The electronic transmission control system as claimed in claim 10, wherein said speed-change ratio retaining means retains the speed-change ratio at a speed-change ratio set just before the desired line pressure exceeds the predetermined line pressure threshold.

12. The electronic transmission control system as claimed in claim 10, wherein the predetermined line pressure threshold is defined as a maximum value of the desired line pressure given for each of speed change ratios of the continuously variable automatic transmission.

13. The electronic transmission control system as claimed in claim 10, wherein the predetermined line pressure threshold is defined as a line pressure set value, providing a downshift limit preselected for each vehicle speed, so that vehicle deceleration feeling is acceptable to just below the downshift limit.

14. The electronic transmission control system as claimed in claim 10, wherein said hydraulic modulating means has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said desired line pressure arithmetic processing means derives the duty cycle value from the desired line pressure, and said comparing means and said decision means cooperate with each other to make a system-failure decision of the electronic transmission control system by comparing the duty cycle value to a predetermined duty cycle set value corresponding to a maximum value of the desired line pressure given for each of speed change ratios of the continuously variable automatic transmission.

15. The electronic transmission control system as claimed in claim 5, wherein said decision means outputs a system-failure decision instruction signal of a binary number "0" when the duty cycle value is above the predetermined duty cycle set value based on the desired speed-change ratio, and said speed-change ratio retaining means retains the speed-change ratio unchanged while the system-failure decision instruction signal of a binary number "0" is output.

16. The electronic transmission control system as claimed in claim 10, wherein said hydraulic modulating means has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said desired line pressure arithmetic processing means derives the duty cycle value from the desired line pressure, and said comparing means and said decision means cooperate with each other to make a system-failure decision of the electronic transmission control system by comparing the duty cycle value to a predetermined duty cycle set value essentially corresponding to a downshift limit that is preprogrammed for each vehicle speed, so that vehicle-deceleration feeling is acceptable to just below the downshift limit.

17. The electronic transmission control system as claimed in claim 16, wherein said decision means outputs a system-failure decision instruction signal of a binary number "0" when the duty cycle value is above the predetermined duty cycle set value based on the vehicle speed, and said speed-change ratio retaining means retains the speed-change ratio unchanged while the system-failure decision instruction signal of a binary number "0" is output.

18. A continuously variable automatic transmission capable of varying a speed-change ratio continuously, comprising:

a speed-change ratio adjusting mechanism for producing a regulated line pressure and a speed-change control pressure necessary to adjust a speed-change ratio hydraulically; and an electronic transmission control system comprising a data processing section performing functions;

setting a desired speed-change ratio based on vehicle speed and engine load;

outputting a control command based on the desired speed-change ratio to said speed-change ratio adjusting device;

calculating a first duty cycle of a line-pressure solenoid valve that corresponds to a desired line pressure based on the engine load and the desired speed-change ratio;

detecting whether the first duty cycle exceeds a second duty cycle of the line-pressure solenoid valve that corresponds to a predetermined line pressure threshold above which the desired line pressure is within an unreasonably high line pressure zone; and retaining the speed-change ratio unchanged, while the first duty cycle exceeding the second duty cycle is detected.

19. The continuously variable automatic transmission as claimed in claim 18, wherein said speed-change ratio adjusting mechanism comprises a line pressure control system producing the regulated line pressure, a speed-change control system having a speed-change control valve fluidly connected to said line pressure control system for receiving the regulated line pressure and for producing the speed-change control pressure by reducing the regulated line pressure depending on a valve position of the speed-change control valve, and a link unit having a stepper motor whose angular movement is produced in response to the control command based on the desired speed-change ratio, and a linkage operable by the stepper motor and mechanically linked to the speed-change control valve for varying the valve position of the speed-change control valve.

20. The continuously variable automatic transmission as claimed in claim 19, wherein said data processing section retains the speed-change ratio unchanged by inhibiting the control command from being output to the stepper motor, while the desired line pressure exceeds the predetermined line pressure threshold.

21. The continuously variable automatic transmission as claimed in claim 20, wherein the predetermined line pressure threshold is defined as a maximum value of the desired line pressure given for each of speed change ratios of the continuously variable automatic transmission.

22. The continuously variable automatic transmission as claimed in claim 20, wherein the predetermined line pressure threshold is defined as a line pressure set value, providing a downshift limit preselected for each vehicle speed, so that vehicle deceleration feeling is acceptable to just below the downshift limit.

23. The continuously variable automatic transmission as claimed in claim 20, wherein said line pressure control system has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said data processing section derives the duty cycle value from the desired line pressure, and makes a system-failure decision of the electronic transmission control system by comparing the duty cycle value to a predetermined duty cycle set value corresponding to a maximum value of the desired line pressure given for each of speed change ratios of the continuously variable automatic transmission.

24. The continuously variable automatic transmission as claimed in claim 23, wherein said data processing section outputs a system-failure decision instruction signal of a binary number "0" when the duty cycle value is above the predetermined duty cycle set value based on the desired speed-change ratio, and retains the speed-change ratio unchanged by inhibiting the control command from being output to the stepper motor while the system-failure decision instruction signal of a binary number "0" is output.

25. The continuously variable automatic transmission as claimed in claim 20, wherein said line pressure control system has at least a duty-cycle controlled electromagnetic solenoid valve, so that the regulated line pressure is adjusted toward the desired line pressure in response to a pulsewidth modulated voltage signal of a duty cycle value, applied to the duty-cycle controlled electromagnetic solenoid valve, said data processing section derives the duty cycle value from the desired line pressure, and makes a system-failure decision of the electronic transmission control system by comparing the duty cycle value to a predetermined duty cycle set value essentially corresponding to a downshift limit that is preprogrammed for each vehicle speed, so that vehicle-deceleration feeling is acceptable to just below the downshift limit.

26. The continuously variable automatic transmission as claimed in claim 25, wherein said data processing section outputs a system-failure decision instruction signal of a binary number "0" when the duty cycle value is above the predetermined duty cycle set value based on the vehicle speed, and retains the speed-change ratio unchanged by inhibiting the control command from being output to the stepper motor while the system-failure decision instruction signal of a binary number "0" is output.

* * * * *